United States Patent [19]
Kovalkov et al.

[11] 3,770,999
[45] Nov. 6, 1973

[54] APPARATUS FOR CONTROL OF THE ROTARY RECTIFIER OF A SYNCHRONOUS MACHINE

[76] Inventors: Geley Alexeevich Kovalkov, Leningradsky prospekt, 26, kv. 174; Olga Vladimirovna Veselova, Naberezhmaya M. Gorkogo, 4/22, korpus B, kv. 68, both of Moscow, U.S.S.R.

[22] Filed: Mar. 17, 1971

[21] Appl. No.: 125,026

[52] U.S. Cl.................................. 310/165, 310/68
[51] Int. Cl. ........................................... H02k 19/26
[58] Field of Search...................... 310/68, 680, 162, 310/163, 164, 87, 165, 105, 211, 269, 87, 258, 88; 318/138, 181, 193, 254

[56] References Cited
UNITED STATES PATENTS

| | | | |
|---|---|---|---|
| 2,741,990 | 4/1956 | White | 310/88 |
| 3,157,810 | 11/1964 | Adkins | 310/258 |
| 3,001,093 | 9/1961 | Wilcox | 310/163 |
| 3,355,648 | 11/1967 | Marie | 310/163 |
| 3,461,331 | 8/1969 | Pannel | 310/68 |
| 3,254,248 | 5/1966 | Hagen | 310/87 |
| 3,371,235 | 2/1968 | Hoover | 310/68 |
| 3,484,669 | 12/1969 | Roberts | 318/193 |
| 3,509,439 | 4/1970 | Schicht | 318/193 |
| 3,131,341 | 4/1968 | Kniazeff | 318/138 |

*Primary Examiner*—R. Skudy
*Attorney*—Holman & Stern

[57] ABSTRACT

An apparatus for controlling rotary rectifiers of a synchronous machine, which has an exciter in the form of a polyphase a.c. generator based on semiconductor devices and designed to supply the field winding of the machine via the rectifiers. The apparatus ensures contactless generation of peak-shaped e.m.f. pulses in the control circuits of the semiconductor devices of the rectifier, distributed in time and number according to the number of phases and semiconductor devices of the rectifier and having the required slope, on/off time ratio and controlled phase of each pulse with respect to the supply voltage of the corresponding phase of the rectifier. The apparatus is designed as a polyphase pulse generator having a stator with non-salient poles and distributed field windings which are electrically perpendicular to one another, and a rotor with teeth whose heads have a maximum cross-sectional area and roots have a minimum cross-sectional area, with windings provided thereon and connected to the control circuits of the semiconductor devices of the rectifier.

4 Claims, 3 Drawing Figures

APPARATUS FOR CONTROL OF THE ROTARY RECTIFIER OF A SYNCHRONOUS MACHINE

The present invention relates to electrical machines, and more specifically to an apparatus for control of the rotary rectifier of a synchronous machine.

In the prior art, there is an apparatus for control of the rotary rectifier of a synchronous machine, made in the form of an electrical machine whose armature winding is connected to the control circuit of the exciter rotary rectifier and arranged in the slots of a rotor whose core has end-plates intended to prevent the core laminations from working loose (see, for example, A.M. Rubenraud, "A static excitation circuit for a synchronous electrical machine with silicon controlled rectifiers," the journal "ELECTRICHESTVO," No. 5, 1965, USSR).

This prior-art apparatus suffers from the following limitations:

To generate control pulses, one requires as many additional devices as there are controlled diodes arranged on the rotor, and these additional devices add up to a size comparable with or exceeding the apparatus itself.

The tooth harmonics in the stator field might produce variations in the angle of the control pulse and, through them, bring about self-oscillations in the system "synchronous machine - regulator - controller - rectifier." Consequently, the use of control pulse shaping circuits may have to be resorted to.

For the reasons stated above, the use of this prior-art apparatus in high-power machines with a rotary rectifier having more than three phases and diodes runs into certain difficulties.

An object of the present invention is to provide an apparatus without these disadvantages.

A specific object of the invention is to provide an apparatus for control of the rotary rectifier of a synchronous machine, which can dispense with circuits which shape control pulses thereby reducing the overall dimensions of the synchronous machine and providing for a more precise control.

With these objects in view, the invention provides an apparatus for control of the rotary rectifier of a synchronous machine, embodied, as in the prior-art case, in the form of an electrical generator, in which apparatus according to the invention the rotor of the machine has as many slots as there are, or a multiple of, phases in the exciter, and each tooth is so shaped that its head facing the stator has a maximum area in a tangential direction, and the root of the tooth has a minimum cross-section. This arrangement makes it possible to generate e.m.f. pulses of the requisite waveform without having to use intermediate pulse-shaping stages.

In order to suppress the effect of tooth harmonics in the stator field in the apparatus and to eliminate the associated error in the control pulse angle, it is preferable to enclose the rotor into a screen made of a electrically conducting, non-magnetic material.

In order to enhance the reliability of the apparatus, the tangentially developed areas on the heads of the rotor teeth may be attached to the end-plates of the rotor core.

An apparatus embodied as described above performs its functions satisfactorily.

For example, in the apparatus disclosed herein and tested on a 200-MW, 3,000-rpm turboalternator with an exciter having 10 poles, 12 phases and 192 thyristors, the rate of rise (slope) of the control pulse was 32 V/degree, and the control power was 0.1 per cent of the exciter power.

In the prior-art apparatus for a three-phase exciter with a rotary rectifier built around three thyristors, the rate of rise (slope) of the control pulse has been reported to be 14 V/degree and the control power, 1.6 per cent of the exciter power.

The invention will be more fully understood from the following description of a preferred embodiment when read in connection with the accompanying drawings, wherein.

Figure 1:
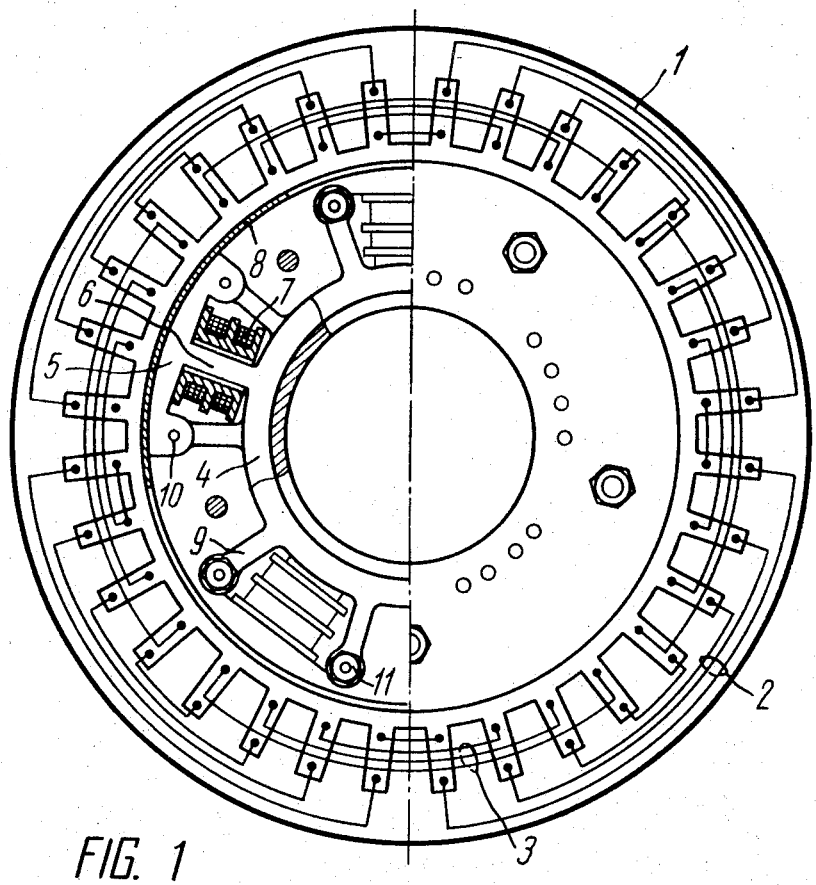
FIG. 1 is a cross-sectional diagrammatic front view through an apparatus for control of the rotary rectifier of a synchronous machine, according to the invention.

Referring to FIG. 1, there is a rotor core 4 arranged inside a stator core 1 having non-salient poles and distributed field windings 2 and 3 which are electrically perpendicular to each other. The rotor 4 has as many teeth as there are, or a multiple of, phases in the exciter, feeding the rotary rectifier for control of which the apparatus disclosed herein is intended. The stator 1 has as many teeth as there are poles in the exciter. Each tooth of the rotor 4 is so shaped that its head 5 facing the stator is developed most in a tangential direction, and the root of the teeth 6 has the minimum cross-section compatible with manufacturing and mechanical considerations. The teeth of the rotator 4 carry armature windings 7, and each tooth carries as many of these armature windings as there are controlled diodes in the rotary rectifier. The core of the rotor 4 is enclosed in a screen 8 made of an electrically conducting, non-magnetic material.

The rotor 4 has end-plates 9 to prevent the core-laminations from working loose.

The end-plates 9 have areas over which they mate with the heads 5 of the teeth in the core of the rotor 4, which are fastened to them by studs 10 and nuts 11. The studs 10 may be either electrically insulated from the core of the rotor 4 and the end-plates 9 or made of an insulating material.

The teeth may be fastened to the end-plates 9 in any other manner, provided no closed electrical loops form around the rotor teeth, which is important in order to improve the characteristics of the apparatus.

The rotor core 4 and windings 7 are closed by covers 12 and 13 (FIG. 2) which sould preferably be made of an insulating material in order to enhance the reliability of the apparatus.

Figure 2:
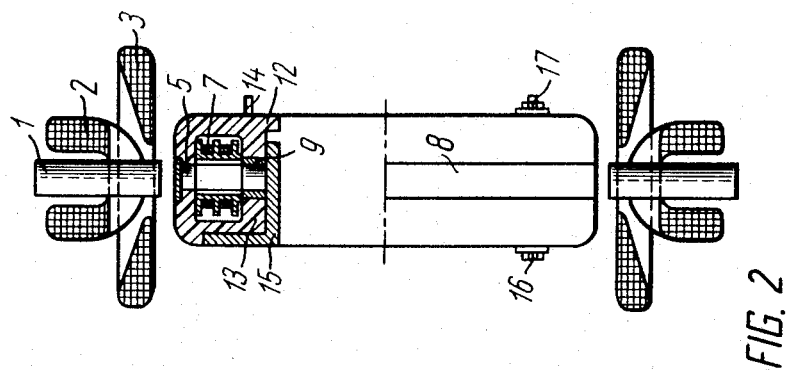
FIG. 2 is a longitudinal sectional view of the same apparatus.

Built into the cover 12 are the leads 14 of the windings 7. The entire rotor structure may be assembled on the exciter shaft or, as shown in FIG. 2, on the intermediate sleeve and held together by bolts 16 and nuts 17.

Figure 3:
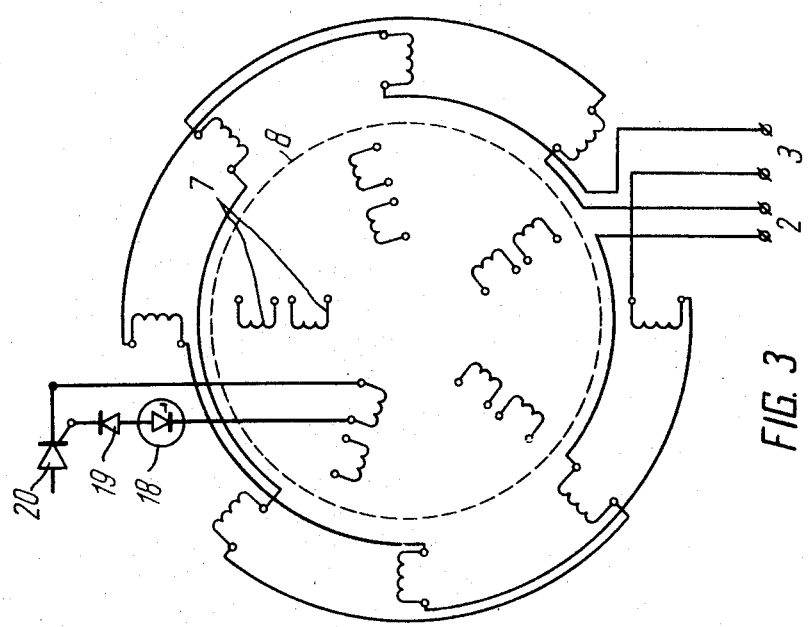
FIG. 3 is the circuit schematic diagram of the apparatus of FIGS. 1 and 2.

FIG. 3 shows the circuit schematic diagram of one embodiment of an apparatus for control of a five-phase, four-pole exciter with a bridge-rectifier built around ten controlled diodes (FIG. 3 shows only one controlled diode). Accordingly, the rotor of the apparatus has five teeth and each tooth carries two windings 7, since each respective phase contains two diodes.

In this case each of the two stator windings 2 and 3 of the apparatus has four poles.

The stator windings 2 and 3 are displaced through 90 electrical degrees relative to each other.

For better radio interference suppression, it is preferable to place in the circuit of each winding 7 a Zener diode 18 and a crystal diode 19, in series with the gate junction of the diode 20.

If the exciter has twice as many (or more) phases as there are poles, it is preferable to divide the rotor core into several segments each having a smaller number of teeth, arranged along the axis of rotation (not shown in the drawings).

The distribution of turns in the windings 2 and 3 should preferably obey the sine law.

When the windings 2 and 3 are energized with a predetermined direct current, a control m.m.f. is induced, sinusoidally distributed along the air gap of the apparatus. Its angular position is decided by the relative magnitudes of the currents in the windings 2 and 3.

When the rotor is rotating, an e.m.f. of the respective phase is induced in its windings 7. Since each tooth of the rotor 4 has a tangentially developed head 5 and a relatively thin root 6, the latter reaches saturation very quickly, and the time waveform of the magnetic flux which links the winding 7 and is produced by the sinusoidal m.m.f. of the stator, has a flattened top. Accordingly, the e.m.f. produced by this flux in the winding 7 has a peaked time waveform. The half-cycle of the e.m.f. not required for control of the diode 20 is clipped by the diode 19, while the Zener diode clips the interference and the gently sloping part of the useful half-cycle of the e.m.f.

As the relative magnitude of the currents in the windings 2 and 3 varies, the angular position of the resultant m.m.f. in space also changes, and so does the phase of the control e.m.f. pulse in time relative to the e.m.f. of the exciter, and this varies the firing angle of the controlled diode 20.

The screen 8 is chosen so that the tooth harmonics of the stator field are cancelled by the eddy-currents of that screen before they can enter the winding 7, while the magnetic flux due to the fundamental wave is attenuated but slightly. As a result, the occurrence of self-oscillations in the closed system "synchronous machine- regulator- control apparatus - exciter" is prevented.

When the rotor is rotating, the heads 5 of the teeth are subjected to appreciable centrifugal forces part of which is transmitted through the fasteners (the studs 10 and the nuts 11) to the end-plates 9, because of which the rotor teeth are unloaded mechanically, and this enables the apparatus disclosed herein to be practically utilized for control of the rotary rectifier of synchronous machines of any power rating, size and speed.

We claim:

1. A synchronous machine for generating and supplying polyphase peak-shaped e.m.f. pulses to a polyphase exciter means having a a plurality of phases, comprising: a stator having non-salient poles and distributed d.c. field windings; and a rotor having an axis concentrically disposed in said stator and having a plurality of tooth means provided on the rotor surface and disposed in spaced parallel relation, the number of said plurality of teeth being an integral multiple of said a plurality of phases of the polyphase exciter means, each of said plurality of teeth having a radially projecting configuration ending in a head facing said stator and a maximum cross-sectional area in a tangential direction at said head, each of said teeth also having a portion of minimum cross-section about which at least one armature winding means is disposed and provided with connecting means to deliver peak-shaped e.m.f. pulses, and said rotor is enclosed in a screen means made of an electrically conductive non-magnetic material for achieving an increased accuracy of pulse-phase control of said peak-shaped e.m.f. pulses.

2. A machine as claimed in claim 1 wherein end plates are provided on the rotor and, fastening means are provided to secure said head of each said tooth means to said end plates, to minimize effects of centrifugal forces.

3. A machine as claimed in claim 2 wherein said fastening means are provided with insulating means to electrically insulate said rotor and tooth means from the fastening means.

4. A machine as claimed in claim 1 wherein said fastening means are made of an electrically insulating material.

* * * * *